United States Patent
Qian et al.

(10) Patent No.: US 11,306,262 B2
(45) Date of Patent: Apr. 19, 2022

(54) PRETREATMENT METHOD AND SYSTEM FOR FRACTION OIL FOR PRODUCTION OF ALKYLBENZENE

(71) Applicant: Inner Mongolia Yitai Coal-based New Materials Research Institute Co., Ltd., Inner Mongolia (CN)

(72) Inventors: Zhen Qian, Inner Mongolia (CN); Jingwei Wu, Inner Mongolia (CN); Xiaolong Zhang, Inner Mongolia (CN); Jingquan Zhang, Inner Mongolia (CN); Juncheng Li, Inner Mongolia (CN); Qinge Jian, Inner Mongolia (CN)

(73) Assignee: INNER MONGOLIA YITAI COAL-BASED NEW MATERIALS RESEARCH INSTITUTE CO., LTD., Erdos (CN)

( * ) Notice: Subject to any disclaimer, the term of this patent is extended or adjusted under 35 U.S.C. 154(b) by 0 days.

(21) Appl. No.: 17/044,196

(22) PCT Filed: Jun. 11, 2019

(86) PCT No.: PCT/CN2019/090729
§ 371 (c)(1),
(2) Date: Sep. 30, 2020

(87) PCT Pub. No.: WO2020/001269
PCT Pub. Date: Jan. 2, 2020

(65) Prior Publication Data
US 2021/0054296 A1    Feb. 25, 2021

(30) Foreign Application Priority Data
Jun. 29, 2018 (CN) .......................... 201810713767.7

(51) Int. Cl.
*C10G 53/12* (2006.01)
*B01D 11/04* (2006.01)
(Continued)

(52) U.S. Cl.
CPC .............. *C10G 53/12* (2013.01); *B01D 11/04* (2013.01); *B01D 17/0214* (2013.01);
(Continued)

(58) Field of Classification Search
CPC ........ C10G 53/04; C10G 53/08; C10G 53/12; C10G 57/005
See application file for complete search history.

(56) References Cited

U.S. PATENT DOCUMENTS

| 4,686,317 A | 8/1987 | Quann et al. |
| 2005/0224394 A1 | 10/2005 | Subramaniyam |

(Continued)

FOREIGN PATENT DOCUMENTS

| CN | 100345803 C | 10/2007 |
| CN | 101056844 A | 10/2007 |

(Continued)

OTHER PUBLICATIONS

International Search Report issued in International Application No. PCT/2019/090729 dated Aug. 20, 2019 (2 pages).
(Continued)

*Primary Examiner* — Renee Robinson
(74) *Attorney, Agent, or Firm* — Osha Bergman Watanabe & Burton LLP

(57) ABSTRACT

Disclosed are a pretreatment method and system for a fraction oil for the production of alkylbenzene, the method comprising: adding a fraction oil, a weak base solution and an inorganic salt solution into a reactor, and leaving same to stand and layering same after the reaction is complete; adding water and an inorganic salt solution into an oil phase (Continued)

for washing with water; extracting same with a polar solvent having a high boiling point, and then adsorbing same with an adsorbent to separate oxygen-containing compounds in the neutral fraction oil; sending the extraction agent containing the oxygen-containing compounds to an extraction agent recovery unit; and then sending the neutral fraction oil to an alkylation reactor for a reaction.

17 Claims, 4 Drawing Sheets

(51) Int. Cl.
*B01D 17/02* (2006.01)
*C10G 57/00* (2006.01)
*C10G 53/08* (2006.01)
*C10G 53/04* (2006.01)

(52) U.S. Cl.
CPC ........... *C10G 57/005* (2013.01); *C10G 53/04* (2013.01); *C10G 53/08* (2013.01); *C10G 2400/22* (2013.01)

(56) References Cited

U.S. PATENT DOCUMENTS

| | | | |
|---|---|---|---|
| 2006/0106255 A1* | 5/2006 | Kenneally | C07C 211/08 564/395 |
| 2006/0211907 A1* | 9/2006 | Pieter de Wet | C10G 2/32 585/864 |
| 2015/0152341 A1 | 6/2015 | Engel et al. | |

FOREIGN PATENT DOCUMENTS

| | | |
|---|---|---|
| CN | 106753546 A | 5/2017 |
| CN | 208632469 U | 3/2019 |
| EP | 1603853 A2 | 12/2005 |

OTHER PUBLICATIONS

Written Opinion issued in International Application No. PCT/2019/090729 dated Aug. 20, 2019 (6 pages).

Extended European Search Report issued in EP Application No. 19826922.7 dated Oct. 5, 2021 (7 pages).

\* cited by examiner

PRETREATMENT METHOD AND SYSTEM FOR FRACTION OIL FOR PRODUCTION OF ALKYLBENZENE

TECHNICAL FIELD

The present invention belongs to the technical field of chemical synthesis, and specifically relates to a pretreatment method and system for fraction oil for the production of alkylbenzene

BACKGROUND

Fischer-tropsch light fraction oil can be used as a raw material for the preparation of alkylbenzene due to its high content of linear olefins. However, the Fischer-Tropsch light fraction oil has complex components, high content of oxygen-containing compounds and weak acidity, therefore, it is not easy to be directly used as the raw material for alkylation reaction, and it requires the pretreatment steps such as neutralizing, washing with water, and removing oxygen-containing compounds. For the steps of neutralizing and washing fraction oil, the process of caustic wash, electrofining, and deacidification of fraction oil is an important means for processing acid-containing crude oil. Since the 1930s, it has been widely used at home and abroad. In the existing caustic wash, electrofining and deacidification process, there is a large excess of alkali. Under the conditions of sodium petroleum, alkali, high temperature and stirring and mixing, sodium hydroxide reacts equimolarly with the petroleum acid in the fraction oil to produce sodium petroleum. Sodium petroleum is an anionic surfactant, which has emulsifying and solubilizing effects on fraction oil, causing serious oil-water emulsification. This requires adding a deacidification agent of fraction oil. The deacidification agent of fraction oil is a multifunctional agent consisting of sodium hydroxide, demulsifier, extraction agent, deoiling agent and other solvents. Among them, the demulsifier has the effect of demulsifying, eliminating emulsification and accelerating the phase separation of the oil agent; the extraction agent extracts sodium petroleum; the deviling agent removes neutral oil in the alkaline residue, and improves the yield of refined oil. The deacidification agent has the functions of reacting with the petroleum acid, demulsifying, extracting sodium petroleum and deoiling.

The existing caustic wash, electrofining, and deacidification process of fraction oil has the following problems: 1. adding strong alkali sodium hydroxide, which results in large alkali consumption, environmental pollution caused by waste liquid that is difficult to manage. 2. The oil and water are easy to emulsify, so the demulsifier is largely consumed and difficult to be recovered; and the product yield is low. 3. High-voltage electric field is used for sedimentation and separation, so the energy consumption is high.

In recent 20 years, efficient and clean deacidification methods have been studied, but these methods have problems of large investment, high operation cost, and being not good enough.

SUMMARY OF THE INVENTION

In order to solve the problems in the prior art, the invention provides a pretreatment method and system for fraction oil for the production of alkylbenzene, which are particularly suitable for pretreating Fischer-Tropsch light fraction oil for the production of alkylbenzene.

In order to achieve the above objects, in one aspect, the present invention provides a pretreatment method for a fraction oil for the production of alkylbenzene, comprising:

adding the fraction oil, a weak base solution and an inorganic salt solution into a reactor, fully stirring, standing still for layering after the reaction is complete, and discharging generated emulsion phase and water phase;

adding water and an inorganic salt solution into the oil phase for washing with water to remove redundant base solution, standing still for layering, and discharging generated emulsion phase and water phase;

conveying neutral fraction oil to an extraction unit, extracting oxygen-containing compounds in the neutral fraction oil by using a high-boiling-point polar solvent, then conveying the neutral fraction oil to an adsorption unit, and conveying an extraction agent containing the oxygen-containing compounds to an extraction agent recovery unit;

in the adsorption unit, an adsorbent is used to adsorb and separate the oxygen-containing compounds in the neutral fraction oil, and then the neutral fraction oil is conveyed to an alkylation reactor for reaction.

Preferably, the weak base solution is selected from one or more of potassium carbonate, sodium carbonate, potassium bicarbonate and sodium bicarbonate.

Preferably, the inorganic salt solution is selected from one or more of potassium chloride, sodium chloride and calcium chloride.

Preferably, the high-boiling-point polar solvent is selected from one or more of N-methylpyrrolidone, ethylene glycol.

Preferably, in the extraction step, the neutral fraction oil is fed in the middle of the extraction unit, and the high-boiling-point polar solvent is fed in the upper part of the extraction unit.

Preferably, in the extraction step, the gas discharged from the extraction unit is cooled and the neutral fraction oil therein is recovered; preferably, the neutral fraction oil therein is recovered at a low-pressure state.

Preferably, in the step of extraction agent recovery, the recovered extraction agent is conveyed into the extraction unit for recycling.

Preferably, in the step of extraction agent recovery, the gas discharged from the extraction agent recovery unit is cooled and the oxygen-containing compounds therein is recovered; preferably, the oxygen-containing compounds therein is recovered at a low-pressure state.

Preferably, the adsorbent is selected from one or more of ZSM-5, 3A, 4A, 5A, 10X, 13X molecular sieves.

Preferably, the neutral fraction oil is preheated before being conveyed to the adsorption unit.

On the other hand, the invention provides a pretreatment system for a fraction oil for the production of alkylbenzene, which comprises a neutralization reaction unit, an extraction unit, an extraction agent recovery unit, and an adsorption unit which are connected in sequence, wherein the neutralization reaction unit is set up with a fraction oil inlet, a water injection port, a weak base solution inlet, an inorganic salt solution inlet, a neutral fraction oil outlet, and an emulsion phase and water phase outlet;

the upper part of the extraction unit is connected with an extraction agent conveying pipeline; the middle part of the extraction unit is connected with the neutral fraction oil outlet of the neutralization reaction unit; the bottom of the extraction unit is connected with an inlet of the extraction agent recovery unit; and the top of the extraction unit is connected with an inlet of the adsorption unit;

the top of the extraction agent recovery unit is connected with oxygen-containing compounds discharge pipeline, and the bottom of the extraction agent recovery unit is connected with an extraction agent conveying pipeline;

the top of the adsorption unit is connected with an alkylation reactor.

Preferably, a nitrogen seal is set up on the top of the neutralization reaction unit.

Preferably, a cooling unit is set up on the top of the extraction unit for cooling and recovering the fraction oil in the discharged gas from the top.

Preferably, the cooling unit is connected to the adsorption unit through an extraction reflux tank. Preferably, the reflux tank is connected to a vacuum pump through a vacuum buffer.

Preferably; a reboiler is set up at the bottom of the extraction unit.

Preferably, a cooling unit is set up on the top of the extraction agent recovery unit for recovering the oxygen-containing compounds in the discharged gas from the top.

Preferably, the cooling unit is connected to the oxygen-containing compounds discharge pipeline via a reflux tank. Preferably, the reflux tank is connected to a vacuum pump through a vacuum buffer.

Preferably, a reboiler is set up at the bottom of the extraction agent recovery unit. Preferably, the adsorption unit is filled with one or more of ZSM-5, 3A, 4A, 5A, 10X, 13X molecular sieves.

Preferably, a preheater is installed between the extraction unit and the adsorption unit.

Preferably, a condenser is installed between the adsorption unit and the alkylation reactor.

Compared with the prior art, the technical solution of the present invention has the following beneficial effects:

1. the method of the present invention uses weak base for neutralization, and the wastewater is easy to be treated;

2. In the method of the present invention, after adding inorganic salt solution for demulsification, the emulsion phase flows into a subsequent work section along with the water phase for treatment; the oil phase is recycled, and the product yield is high;

3. The method of the present invention does not require high-voltage electric field for sedimentation, and has low energy consumption;

4. The extraction agent in the present invention is a high-boiling-point polar extraction agent, with a wider selection range and less difficulty in operation.

5. The present invention uses gaseous adsorption, resulting in that the adsorption effect is more significant, and the content of the oxygen-containing compounds can be reduced to less than 0.1 ppm.

DETAILED DESCRIPTION

In order to make the objects, technical solutions and advantages of the present invention more apparent, the present invention is further described in detail with reference to the accompanying drawings in combination with the specific examples.

Figure 1:
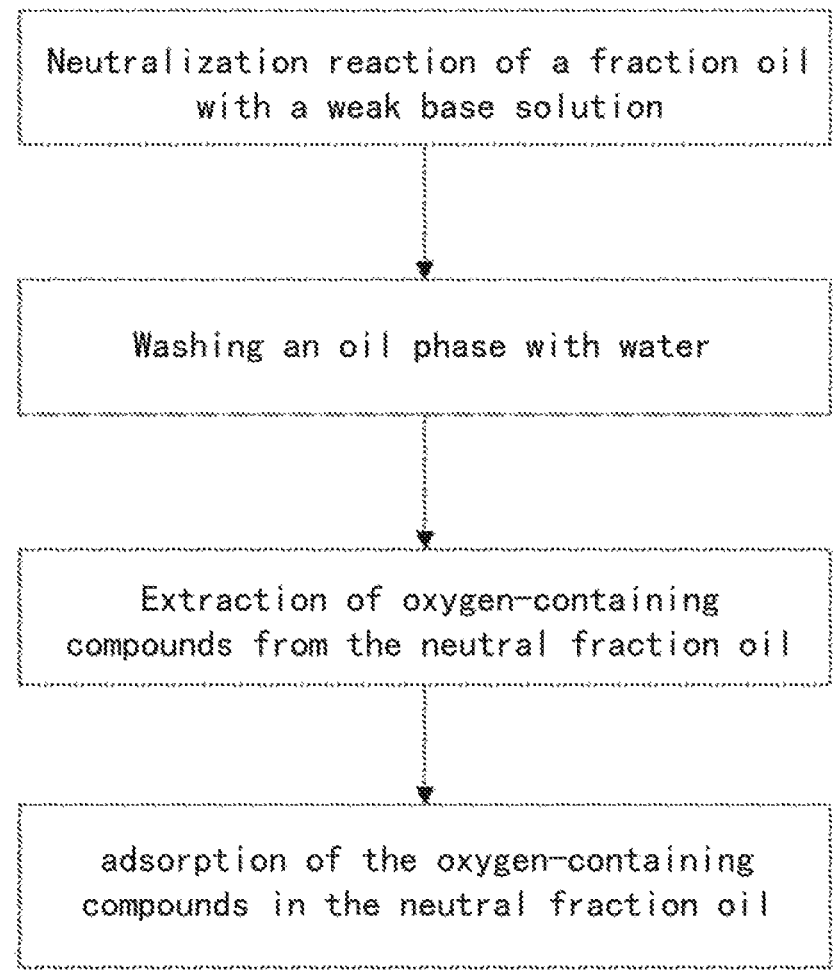
FIG. 1 is a flow diagram of a pretreatment method for a fraction oil of the present invention.

As shown in FIG. 1, the present invention provides a pretreatment method for a fraction oil for the production of alkylbenzene, comprising:

(1) neutralization reaction of a fraction oil with a weak base solution.

In this step, adding a fraction oil, a weak base solution and an inorganic salt solution into a reactor, fully stirring, standing still for layering after the reaction is complete, and discharging generated emulsion phase and water phase.

(2) washing the oil phase with water

In this step, adding water and an inorganic salt solution into the oil phase for washing with water to remove redundant base solution, standing still for layering, and discharging generated emulsion phase and water phase.

(3) extraction of oxygen-containing compounds from the neutral fraction oil.

In this step, conveying neutral fraction oil to an extraction unit, extracting oxygen-containing compounds in the neutral fraction oil by using a high-boiling-point polar solvent in the extraction unit, then conveying the neutral fraction oil to an adsorption unit, and conveying an extraction agent containing the oxygen-containing compounds to an extraction agent recovery unit;

(4) adsorption of the oxygen-containing compounds in the neutral fraction oil

In this step, an adsorbent is used to adsorb and separate the oxygen-containing compounds in neutral fraction oil, and then the neutral fraction oil is conveyed to an alkylation reactor for reaction.

Figure 2:
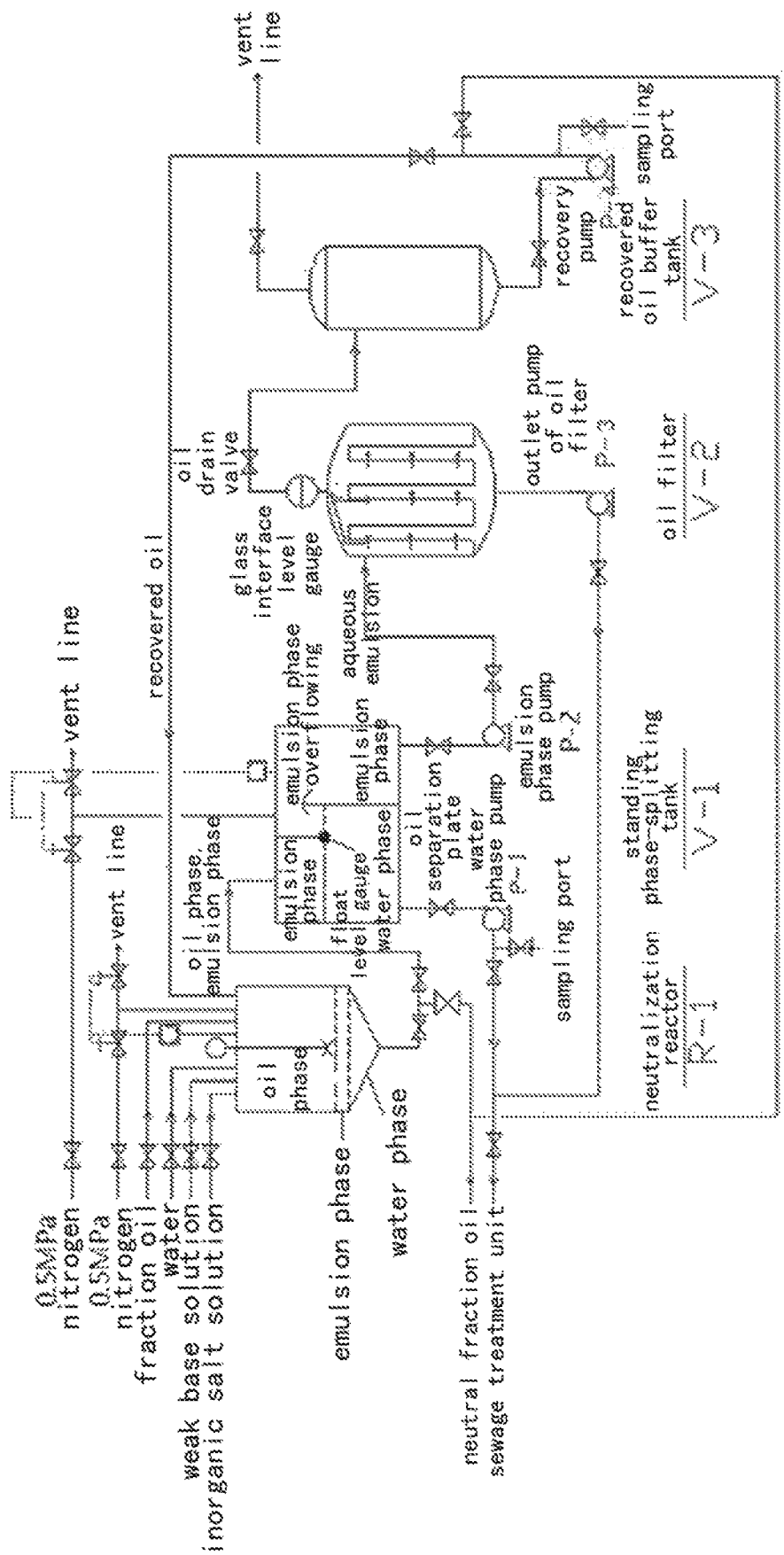
FIG. 2 is a schematic diagram of a neutralization unit and a treatment unit of emulsion phase and water phase of fraction oil pretreatment system in the Example of the present invention.

As shown in FIG. 2, in one example, the raw materials are first entered a neutralization reactor R-1, and pipelines of fraction oil, water, inorganic salt demulsifier and potassium carbonate solution are respectively installed at the top of the reactor. The top of the reactor is set up with a nitrogen seal and a split control to maintain the internal pressure of the reactor at 0.25~0.35 MPa.

First fully stirring the fraction oil, a proper amount of potassium carbonate solution and inorganic salt solution for 4 hours, standing still for layering for 1 hour after complete reaction, discharging the emulsion phase and water phase to a standing phase-splitting tank through a bottom outlet pipe, then injecting water for washing, removing redundant base solution, and adding a proper amount of inorganic salt solution during washing.

After washing with water, standing still and layering for 1 hour, discharging the emulsion phase and water phase to a standing phase-splitting tank, and then conveying neutral fraction oil out of the device.

The inside of the standing phase-splitting tank V-1 is set up with an oil separation plate and a float level gauge, to control the interface level of the emulsion phase and the water phase being not higher than the height of the oil separation plate, and the emulsion phase exceeding the height of the oil separation plate overflows to the other side of the oil separation plate. The top of the phase-splitting tank is set up with a nitrogen seal and a split control to maintain the internal pressure at 0.2~0.3 MPa.

After standing for 1 hour (the standing is considered to be started once no material is fed by the neutralization reactor in the previous step), the water phase is sent to a water treatment unit through a water phase pump P-1; the aqueous emulsion is sent to an oil filter V-2 by an emulsion phase pump P-2.

The aqueous emulsion is sent to an oil filter V-2 through an emulsion phase pump P-2, and the outlet pressure of the emulsion phase pump P-2 is controlled to be 0.2~3.0 Mpa.

The inside of the oil filter is set up with a non-woven fabric cartridge or other similar oil filtering materials, and the top of the oil filter is set up with a glass interface level gauge. Water molecules can pass through the cartridge and accumulate at the bottom of the container; oil molecules cannot pass through the cartridge and accumulate as large oil droplets on the surface of the cartridge and rise to the top of the container.

The oil level is regularly observed through the glass interface level gauge, and when the oil level reaches the middle part of the interface level gauge, the top oil drain valve is opened to discharge the oil to the recovered oil buffer tank V-3.

The top of the recovered oil buffer tank is set up with a pressure gauge and a vent line to maintain the pressure in the pipe at a normal pressure.

After a liquid level is established in the recovered oil buffer tank V-3, a recovery pump P-4 is started to send the recovered oil back into the neutralization reactor R-1 to finish the recovery of the light fraction oil; the recovered oil can also be directly sent out of the device according to the working conditions.

Figure 3:
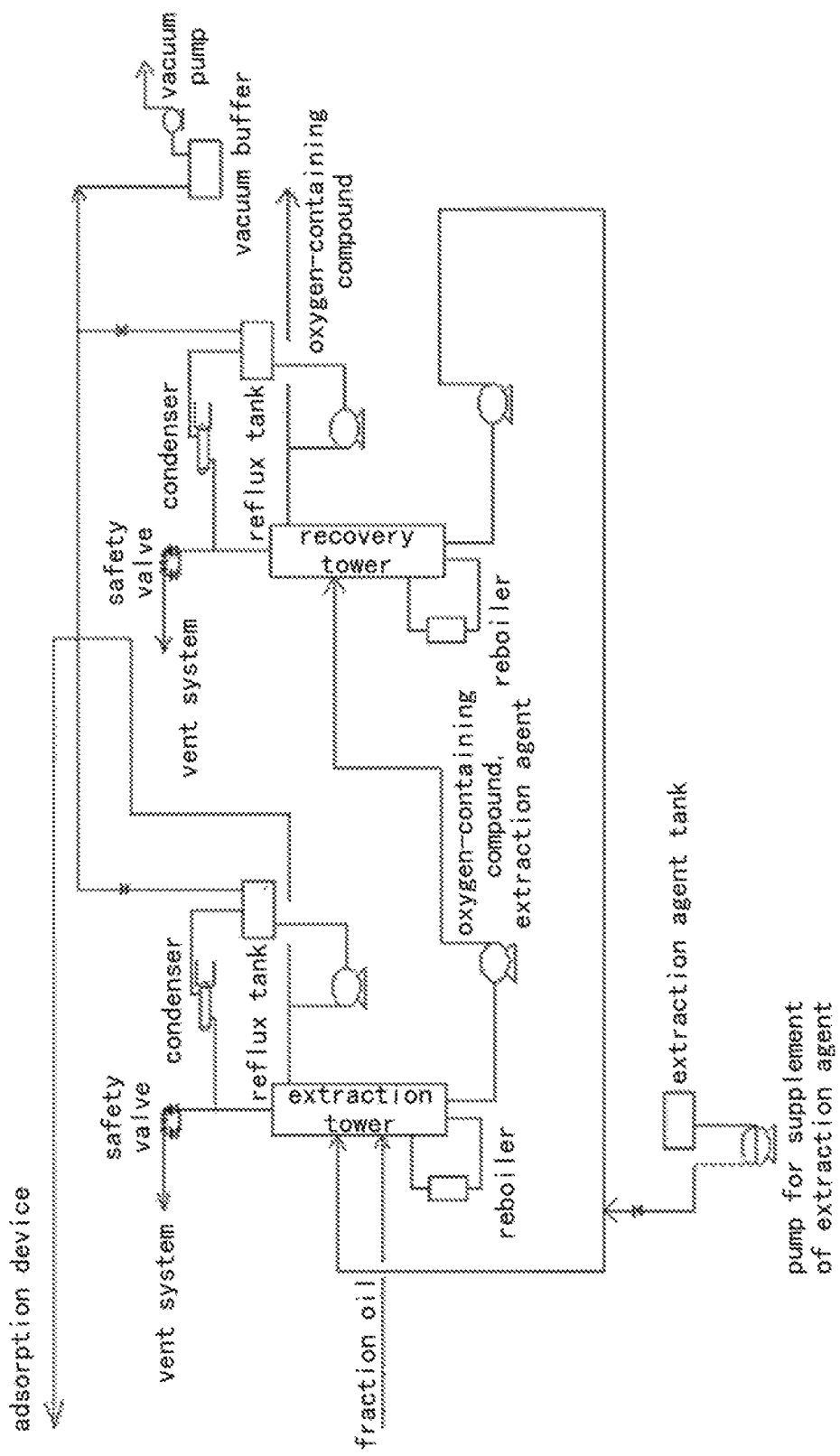
FIG. 3 is a schematic diagram of the extraction unit and the extraction agent recovery unit of fraction oil pretreatment system in the Example of the present invention.

As shown in FIG. 3, neutral fraction oil from the neutralization reactor R-1 enters into an extraction tower (middle feeding), and is in reverse contact with high-boiling-point polar solvent such as NMP or ethylene glycol (top feeding). The oxygen-containing compounds are further removed by the desorption device of alkane-alkene mixture on the top of the tower. At the bottom of the tower is a mixture of oxygen-containing compounds and extraction agent; the mixture enters the recovery tower for separating the extraction agent. The oxygen-containing compounds is fractionated from the top of the tower, and the extraction agent is fractionated from the bottom of the tower and enters the extraction tower for recycling.

The operating temperature of the extraction tower is 0-300° C. at the bottom of the tower and 0-200° C. at the top of the tower. The operating pressure is 1 Pa-2.0 MPa. Preferably, the temperature at the bottom of tower is 150'C-260° C.; the temperature at the top of tower is 50-150° C. and the operating pressure is 0.5-1 kPa.

The operating temperature of the recovery tower is 0-300° C. at the bottom of the tower and 0-200° C. at the top of the tower; the operating pressure is 1 Pa-2.0 MPa. Preferably, the temperature at the bottom of tower is 150° C.-260° C.; the temperature at the top of tower is 50-160° C. and the operating pressure is 0.5-1 kPa.

Figure 4:
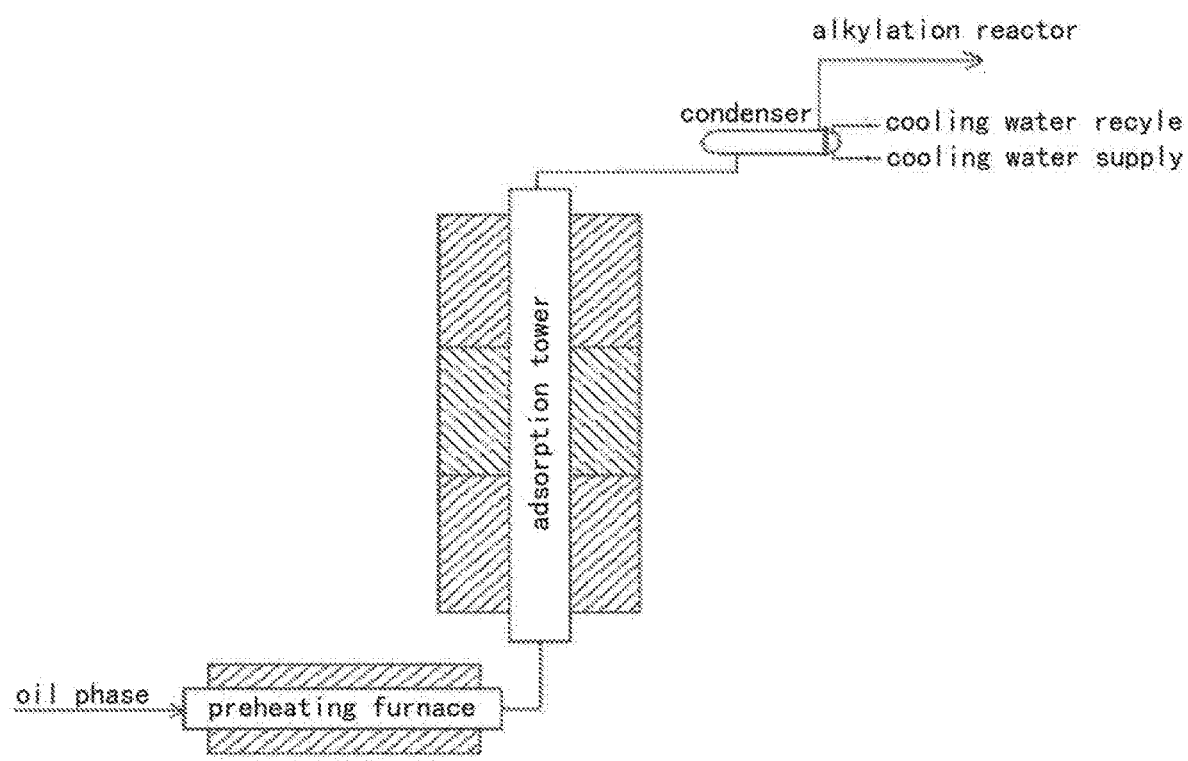
FIG. 4 is a schematic diagram of the adsorption unit of fraction oil pretreatment system in the Example of the present invention.

As shown in FIG. 4, the neutral fraction oil (alkane-alkene mixture) from the extraction tower enters a preheating furnace, and then enters the adsorption tower installed with molecular sieves to further adsorb and separate the oxygen-containing compounds. The raw materials are heated and then adsorbed in a gaseous state; the adsorbed alkane-alkene mixture enters the alkylation reactor for reaction.

The adsorbent in the adsorption tower can be ZSM-5, 3A, 4A, 5A, 10X, 13X and other similar molecular sieves. The operating temperature of the preheating furnace is 50-300° C., preferably 150-300° C., and the operating pressure is 0.1 MPa-2.0 MPa. The adsorption tower has two working conditions, namely normal-temperature adsorption and high-temperature desorption, the operating temperature of the adsorption tower is 0-300° C., and the operating pressure is 0.1 MPa-2.0 MPa.

The specific example described above further describe the purpose, technical solutions and beneficial effects of the present invention in further detail. It should be understood that the above are only specific examples of the present invention and are not intended to limit the present invention. Any modifications, equivalent substitutions, improvements and the like made within the spirit and principle of the present invention should be included in the protection scope of the present invention.

The invention claimed is:

1. A method for pretreatment of a fraction oil for the production of alkylbenzene, characterized in comprising the following steps:
    reacting a fraction oil, a base solution and an inorganic salt solution in a reactor, fully stirring, standing still for layering after the reaction is complete, and discharging a generated emulsion phase and a water phase, leaving an oil phase;
    adding water and an inorganic salt solution into the oil phase for washing with water to remove redundant base solution, standing still for layering, and discharging a generated emulsion phase and a water phase, leaving a neutral fraction oil;
    conveying the neutral fraction oil to an extraction unit, extracting oxygen-containing compounds in the neutral fraction oil by using a polar solvent, then conveying the neutral fraction oil to an adsorption unit, and conveying an extraction agent containing the oxygen-containing compounds to an extraction agent recovery unit;
    in the adsorption unit, using an adsorbent to adsorb and separate the oxygen-containing compounds in the neutral fraction oil, and then the neutral fraction oil is conveyed to an alkylation reactor for reaction.

2. The method for pretreatment of a fraction oil according to claim 1, wherein the base solution is selected from one or more of potassium carbonate, sodium carbonate, potassium bicarbonate and sodium bicarbonate.

3. The method for pretreatment of a fraction oil according to claim 1, wherein, the inorganic salt solution is selected from one or more of potassium chloride, sodium chloride and calcium chloride.

4. The method for pretreatment of a fraction oil according to claim 1, wherein the polar solvent is selected from one or both of N-methylpyrrolidone and ethylene glycol.

5. The method for pretreatment of a fraction oil according to claim 1, wherein, in the extraction step, the neutral fraction oil is fed in the middle of the extraction unit, and the polar solvent is fed in the upper part of the extraction unit.

6. The method for pretreatment of a fraction oil according to claim 1, wherein in the extraction step, a gas mixture discharged from the extraction unit is cooled and the neutral fraction oil therein is recovered.

7. The method for pretreatment of a fraction oil according to claim 1, wherein, in the step of extraction agent recovery, the recovered extraction agent is conveyed into the extraction unit for recycling.

8. The pretreatment method for a fraction oil according to claim 1, wherein, in the step of extraction agent recovery, a gas mixture discharged from the extraction agent recovery unit is cooled and the oxygen-containing compounds therein is recovered.

9. The method for pretreatment of a fraction oil according to claim 1, wherein, the adsorbent is selected from one or more of ZSM-5.3A, 4A, 5A, 10X, and 13X molecular sieves.

10. The method for pretreatment of a fraction oil according to claim 1, wherein, the neutral fraction oil is preheated before being conveyed to the adsorption unit.

11. A system for pretreatment of a fraction oil for the production of alkylbenzene, characterized in comprising a neutralization reaction unit, an extraction unit, an extraction agent recovery unit, and an adsorption unit which are connected in sequence, wherein the neutralization reaction unit is set up with a fraction oil inlet, a water injection port, a base solution inlet, an inorganic salt solution inlet, a neutral fraction oil outlet, and an emulsion phase and water phase outlet;

the upper part of the extraction unit is connected with an extraction agent conveying pipeline; the middle part of the extraction unit is connected with the neutral fraction oil outlet of the neutralization reaction unit: the bottom of the extraction unit is connected with an inlet of the extraction agent recovery unit; and the top of the extraction unit is connected with an inlet of the adsorption unit;

the top of the extraction agent recovery unit is connected with oxygen-containing compounds discharge pipeline, and the bottom of the extraction agent recovery unit is connected with an extraction agent conveying pipeline;

the top of the adsorption unit is connected with an alkylation reactor.

12. The system for pretreatment of a fraction oil according to claim 11, wherein a cooling unit is set up on the top of the extraction unit for cooling and recovering the fraction oil in a top discharged gas.

13. The system for pretreatment of a fraction oil according to claim 12, wherein the cooling unit is connected to the adsorption unit through an extraction reflux tank.

14. The system for pretreatment of a fraction oil according to claim 11, wherein a cooling unit is set up on the top of the extraction agent recovery unit for recovering the oxygen-containing compounds in a top discharged gas.

15. The system for pretreatment of a fraction oil according to claim 14, wherein the cooling unit is connected to the oxygen-containing compounds discharge pipeline through a reflux tank.

16. The system for pretreatment of a fraction oil according to claim 11, wherein a preheater is installed between the extraction unit and the adsorption unit.

17. The system for pretreatment of a fraction oil according to claim 11, wherein a condenser is installed between the adsorption unit and the alkylation reactor.

* * * * *